UNITED STATES PATENT OFFICE.

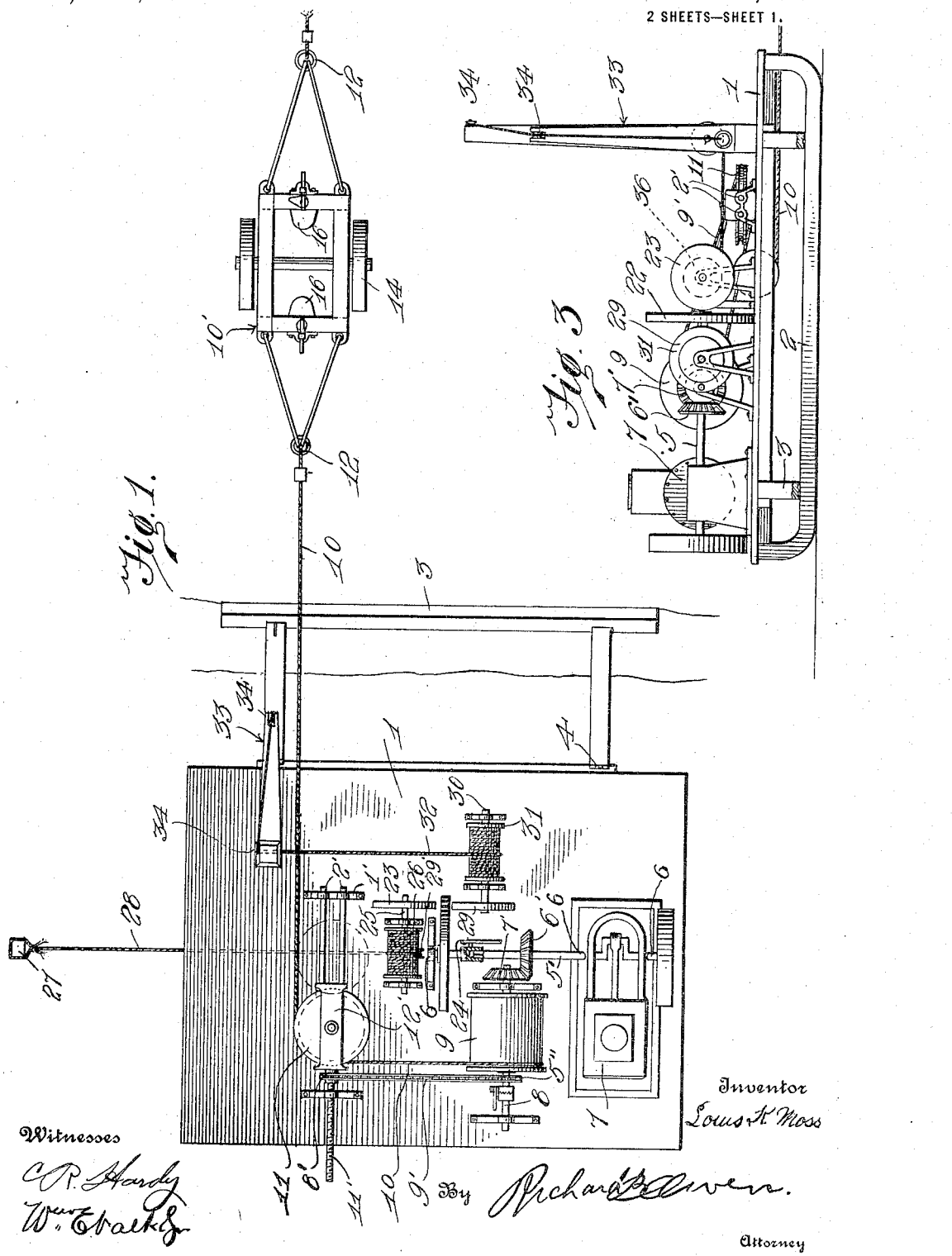

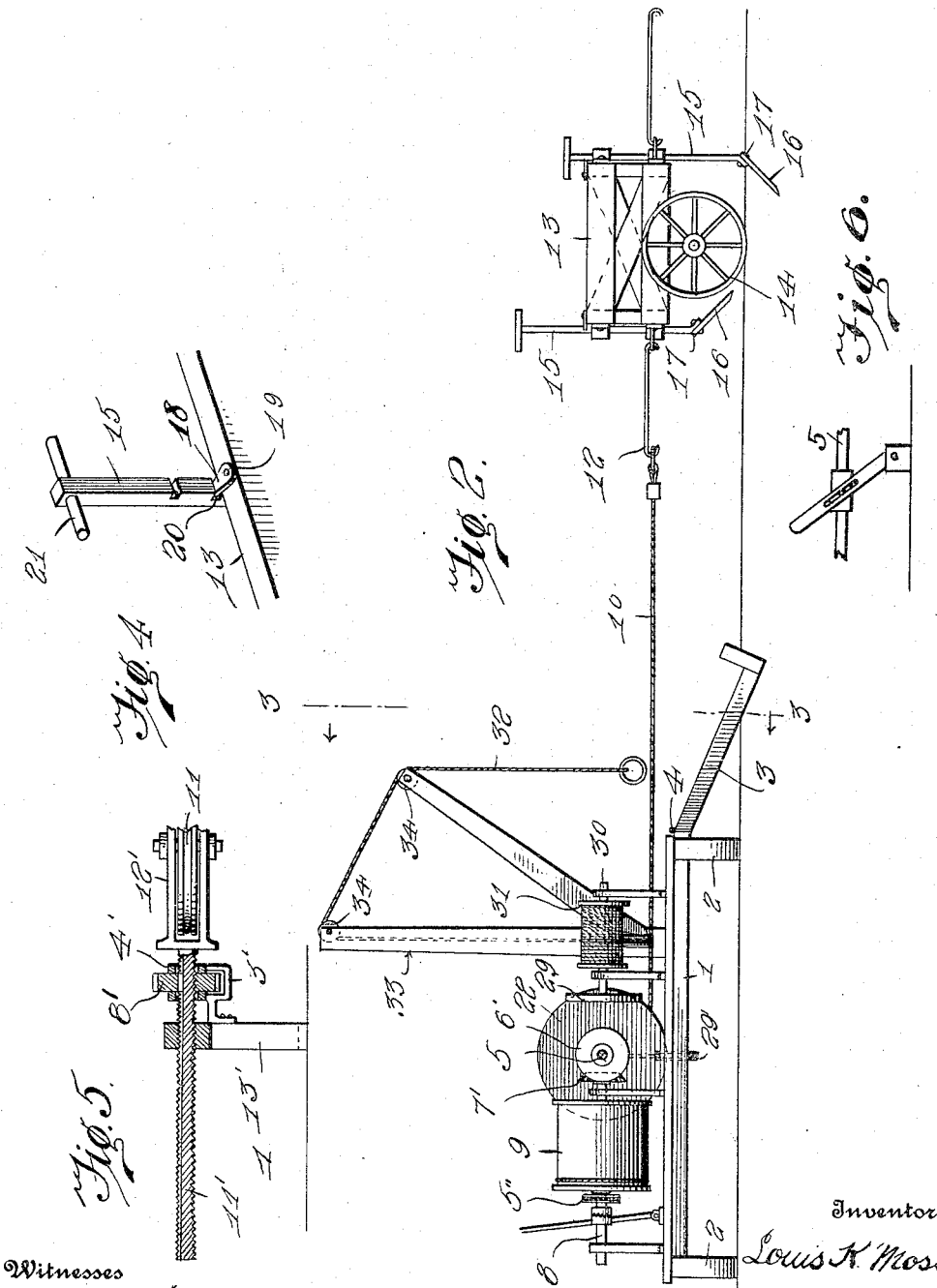

LOUIS K. MOSS, OF BIRMINGHAM, ALABAMA.

DRAFT APPLIANCE FOR PLOWS, &c.

1,206,576.  Specification of Letters Patent.  Patented Nov. 28, 1916.

Application filed January 21, 1915. Serial No. 3,566.

*To all whom it may concern:*

Be it known that I, LOUIS K. Moss, citizen of the United States, residing at Birmingham, in the county of Jefferson and State of Alabama, have invented certain new and useful Improvements in Draft Appliances for Plows, &c., of which the following is a specification.

My invention is designed as an improved draft appliance to be used in connection with agricultural devices and implements generally, and more specifically to an apparatus for clearing, grading, ditching, plowing and cultivating land, and for gathering, stripping and moving clay and other materials.

The object of the invention is to so position two or more trucks, each equipped with a motor and drum, as to pull an implement or agricultural device back and forth across a field or other tract of land.

A further object of the invention is to provide a novel means for moving the truck or platform longitudinally of the land under treatment.

Still further objects of the invention are to provide a means for lifting and turning the plow or other implement in use; to provide a system of braces or anchors for holding the platform or truck steady and in place; and to provide a carriage or tractor to which the plow blade, cultivator teeth, rake head or other implement may be adjustably and removably attached.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a top plan view illustrating the manner in which a single platform or truck is affixed to the carriage or tractor, is anchored or braced, and is attached to a relatively stationary support; Fig. 2 is a side elevation of the apparatus as illustrated in Fig. 1; Fig. 3 is a section on the line 3—3 of Fig. 2; Fig. 4 is a fragmentary sectional view illustrating the manner in which the support rods of the tractor device are maintained in the desired adjusted position; and Fig. 5 is a detail longitudinal sectional view of the movable sheave. Fig. 6, is a detail view of one of the clutch members and illustrating the manner of its operation.

Referring now to the drawings by numerals, 1 designates the truck or platform which, to facilitate movement longitudinally of the land, is mounted on runners 2. The runners 2 extend longitudinally of the truck and, with a suitable brace beam 3, anchor the truck against lateral displacement when subjected to lateral strain incident to its use. The brace beam 3 is of a size to extend throughout the greater portion of the length of the platform 1 and is hinged thereto as indicated at 4, the beam when in use being adapted to fit or penetrate the soil as indicated to advantage in Figs. 1 and 2; a furrow extending longitudinally of the land being first made or cut to receive the brace. By connecting the brace to the platform as indicated at 4, it is evident that the former may be elevated or raised into an inoperative position if desired.

An operating crank shaft 5 is mounted on the platform 1 in suitable bearings 6 therefor, the said shaft extending longitudinally of the platform and receiving its motive power through the agency of an engine or motor 7 likewise mounted on the truck. Mounted on shaft 5 is a bevel gear 6' which meshes with a like gear 7' mounted on a shaft 8 extending at an angle to said shaft 5, the shaft 8 being hereinafter referred to as the driven shaft. Said shaft 8 carries a drum 9 to which is attached a rope or cable 10, the latter operating over a movable sheave 11 (mounted in a manner to be hereinafter fully described) being connected at its opposite end with a novel carriage or tractor device designated as an entirety by the numeral 10', said rope or cable being affixed to the tractor as indicated at 12.

Tractor 10' in its preferred embodiment consists of a suitable frame 13 and a wheeled support 14 therefor, such construction facilitating movement of the tractor device back and forth across the land when in use. At each end of the frame 13 I mount a vertically adjustable support rod 15, the said rod being of an appropriate structure whereby to provide for the detachable connection of the agricultural implement 16 thereto. The implement shown in the drawings is intended to be used for plowing or cultivating the soil. The detachable connection is indicated at 17 in Fig. 2.

By the arrangement of a support rod at each end of the tractor it is evident that the land or soil may be treated irrespective of the direction of movement of the said tractor device, one of the support rods being adjusted to maintain its associated implement out of engagement with the soil, while the other of the said rods is adjusted to position its implement in penetrating engagement with the soil. To support the rod in the desired adjusted position, I provide a suitable pawl 18 pivoted as at 19 to the tractor frame, the pawl being engageable with any one of a plurality of notches 20 formed in the support rod which, to prevent rotation, is preferably square in cross section. A handle 21 may be provided for each rod.

Now in order that the sheave 11 may be moved back and forth to uniformly wind the cable 10 upon the drum 9, said sheave is mounted for movement transversely of the platform 1, its movement being controlled by the rotation of said drum. A sprocket 5″ is mounted on the shaft 8 before mentioned, said sprocket 5″ having connection with a like sprocket 8′ through the medium of a chain 9′, the latter sprocket 8′ being mounted on a screw rod 11′ which is directly fastened to the bracket 12′ which acts as a support for the sheave 11. Bracket 12′ is mounted for movement on guide rails 2′, the rails being in turn supported in the proper manner as by the uprights 1′ shown. The sprocket 8′ is keyed to the screw rod 11′ and is held against movement by means of an arm 3′ provided with a bifurcated terminal between the extensions of which the said sprocket 8′ operates. Rod 11′ is arranged to pass through openings therefor 4′ in the extension of the arm 3′, such arrangement being shown to advantage in Fig. 5. A bearing support 13′ is mounted on the platform 1, the said bearing support being provided with a threaded bore through which the screw rod 11′ extends. Said bearing 13′ being stationary with respect to the platform and the drum 9, it is evident that by turning the said rod with the drum that the screw rod will be rotated and caused to move transversely of the platform or longitudinally of the guide rails 2′ thereby causing the sheave 11 to move with the drum and the cable or rope 10 to be uniformly wound thereon.

The manner in which the tractor device 10 is propelled having been fully set forth, I shall now proceed to describe the mechanism utilized to bodily move the truck or platform 1 longitudinally of the land immediately subsequent to back and forth movement of the tractor device. A friction disk 22 is mounted on the shaft 5, said disk being movable bodily into and out of engagement with a like disk 23 through manipulation of a suitable clutch lever 24. Disk 23 is mounted to rotate with a shaft 25 arranged as shown to extend in a direction at right angles to shaft 5, the former (the shaft 25) supporting a drum 26 having connection with a suitable stationary support 27 through the medium of a rope or cable 28 operating over a sheave or pulley 29 mounted in an opening therefor in the platform 1. When it is desired that the platform 1 be moved toward the stationary support 27, it is but necessary to manipulate the clutch lever 24 whereby to engage the disk 22 with the disk 23 to in this manner drive or rotate the drum 26. As the drum is rotated, the rope or cable 28 will wind thereon and in this manner bodily move the truck or platform toward the stationary support, the runners 2 aiding and facilitating such bodily movement. Disk 22 may also be moved into driving frictional engagement with a third disk 29, the latter being mounted to engage the opposite face of the disk 22 from that engaged by the disk 23. Said disk 29 is mounted on a shaft 30 arranged to extend parallel with the shaft 25 and to support a drum 31 having a rope or cable 32 wound thereon. A derrick support 33 is mounted on the platform 1 at one side of the drum 31, the said rope or cable 32 being adapted to operate over pulleys 34 mounted on the said structure whereby to raise and lower either the brace beam 3 or the tractor 10 when it is desired that the former be elevated from engagement with the soil and the latter lifted and turned.

While in the drawings I have shown but a single truck or platform 1, it is to be understood that in use, two of the said platforms are required, one platform being positioned at each side of the field or tract of land to be treated. Both platforms are to be equipped with the mechanism before described, the operating rope or cable of each drum 8 being affixed to the tractor 10 at the opposite ends thereof as shown. By such arrangement, it is evident that one drum 8 may be driven to propel the tractor while the drum on the opposite platform is idle upon its supporting shaft so as to permit of an unobstructed unwinding movement. The tractor having been pulled or drawn from one to the opposite side of the land, the pulling cable is slacked, the pulling drum made to idle on the driving shaft and the heretofore idle drum on the other platform made to rotate whereby to reversely pull the tractor back again to the position from whence it started. The platform 1 is of course removed immediately subsequent to the pulling action imparted to the tractor 10, such movement of the truck being effected through the engagement of the disk 22 with the disk 23 as hereinbefore set forth.

From the foregoing, taken in connection with the accompanying drawings it will be noted that the cultivation or other treatment of land may be accomplished with facility and ease and with a uniformity or regularity heretofore impossible; that the motor 7 is so connected with the various mechanisms mounted on the truck as to provide for the proper operation of all; and that vertical adjustment of the support rod 15 is made possible by the novel arrangement of the pawl 18 relatively to the notches 20 formed therein.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In combination, opposed trucks, a tractor movable from one to the other of the trucks, means on each truck to move the tractor, and means to move each truck for the purpose specified.

2. In combination, two trucks, a tractor movable from one to the other of the trucks, a motor mounted on each truck to move the tractor, means to free one motor during the operation of the other, means to bodily move the trucks through action of the motor, and means driven through action of the motor to elevate the tractor.

3. In a device of the character described, a platform, runners forming a support for the platform, means to brace the platform against lateral movement, a stationary support, a motor mounted on the platform, a drum, means to rotate the drum through action of the motor, and means wound upon the drum and connected to the stationary support for moving the truck longitudinally and toward said stationary support for the purpose specified.

4. In combination, a truck, an engine mounted thereon, a tractor, a stationary support, means mounted on the platform, and driven through action of the motor to move said truck toward said structure, means mounted on the platform and driven through action of the engine to move the tractor toward the truck, and a derrick mounted on the platform to move the tractor for the purpose specified.

5. In a device of the character described, a platform, a motor mounted thereon, an operating shaft driven through action of the motor, a drum on said shaft, a tractor, means connecting the tractor and the drum to move the former relatively to the platform, a friction disk mounted on the shaft, a second drum, a stationary support, means connecting the stationary support and the said second drum, means to rotate the drum through rotation of the first mentioned shaft, said means operating to move the truck bodily toward said stationary support through rotation of the drum, and means to brace the platform against lateral movement during actuation of the first mentioned drum to move the tractor.

6. A draft appliance for soil treating implements comprising a truck, a motor mounted on said truck, a stationary support, a connection between the truck and said support for moving the former toward said support through action of said motor, a connection between the soil treating implement and the truck for moving the former toward said truck, and a means to brace said truck.

7. In a draft appliance for soil treating implements, a truck, a propelling means therefor, a connection between the truck and the soil treating implement, a means on the truck to move said implement toward said truck, a means to laterally brace the truck during movement of the soil treating implement, and a means to reverse the position of the soil treating implement when desired.

8. A draft appliance for soil treating implements comprising opposed trucks, a motor mounted on each truck, a connection between said implement and each truck, a means on each truck and engaging with the respective connections to move said implement back and forth between the trucks through action of the respective motors, and a means to free one of said motors during operation of the other.

9. A draft appliance for soil treating implements comprising opposed trucks, a connection between the soil treating implement and each truck, a motor mounted on each truck, a means on each truck engaging with the respective connections to move the soil treating implement back and forth between the trucks through action of the respective motors, a means to free one of said motors during operation of the other, and a means to laterally brace the trucks during back and forth movement of said implement.

In testimony whereof I affix my signature in presence of two witnesses.

LOUIS K. MOSS.

Witnesses:
B. J. CHEESEMAN,
M. A. LAYET.